(12) United States Patent
Letocart

(10) Patent No.: US 8,336,189 B2
(45) Date of Patent: Dec. 25, 2012

(54) METHOD FOR ELECTRICALLY SECURING AN ELECTRICAL POWER SUPPLY OF A SYSTEM WITH VARIABLE OPTICAL PROPERTIES

(75) Inventor: Philippe Letocart, Raeren (BE)

(73) Assignee: Saint-Gobain Glass France, Courbevoie (FR)

( * ) Notice: Subject to any disclaimer, the term of this patent is extended or adjusted under 35 U.S.C. 154(b) by 23 days.

(21) Appl. No.: 13/002,412

(22) PCT Filed: Jul. 2, 2009

(86) PCT No.: PCT/FR2009/051285
§ 371 (c)(1),
(2), (4) Date: Mar. 25, 2011

(87) PCT Pub. No.: WO2010/001057
PCT Pub. Date: Jan. 7, 2010

(65) Prior Publication Data
US 2011/0167617 A1      Jul. 14, 2011

(30) Foreign Application Priority Data
Jul. 4, 2008 (FR) ..................... 08 54586

(51) Int. Cl.
*H01S 4/00* (2006.01)
(52) U.S. Cl. ............... 29/592.1; 29/595; 29/825; 361/42
(58) Field of Classification Search .............. 29/592.1, 29/595, 825; 361/42
See application file for complete search history.

(56) References Cited

U.S. PATENT DOCUMENTS

| 4,023,887 | A | * | 5/1977 | Speers ........................... 385/50 |
| 4,285,022 | A | * | 8/1981 | Lewiner et al. ................ 361/45 |
| 4,409,637 | A | | 10/1983 | Block |
| 4,435,047 | A | | 3/1984 | Fergason |
| 4,732,456 | A | | 3/1988 | Fergason et al. |
| 4,806,922 | A | | 2/1989 | McLaughlin et al. |
| 5,241,443 | A | | 8/1993 | Efantis |
| 6,021,033 | A | * | 2/2000 | Benham et al. ................ 361/42 |
| 6,211,684 | B1 | * | 4/2001 | McKee et al. ................ 324/548 |

FOREIGN PATENT DOCUMENTS

| EP | 0 238 164 | 9/1987 |
| EP | 1 553 153 | 7/2005 |
| GB | 977913 | 12/1964 |
| JP | 05-256034 | 10/1993 |
| WO | WO 92/19695 | 11/1992 |

OTHER PUBLICATIONS

International Search Report as issued for PCT/FR2009/051285, dated Feb. 15, 2010.

* cited by examiner

*Primary Examiner* — Carl Arbes
(74) *Attorney, Agent, or Firm* — Pillsbury Winthrop Shaw Pittman LLP

(57) ABSTRACT

A method of making an electrical power supply of an electrically controllable system having variable optical properties, when fitted near water, electrically safe, the electrically controllable system comprising a carrier substrate that bears an electroactive element placed between first and second electrodes supplied with a periodic voltage U(t) having a given maximum RMS value $U_0$ at a given low supply frequency, the method including limiting the touch potential at an input or output terminal of the electrically controllable system to a maximum value of 50 V or less, the touch potential being defined as the potential experienced by the human body in case of contact with the input or output terminal.

18 Claims, 3 Drawing Sheets

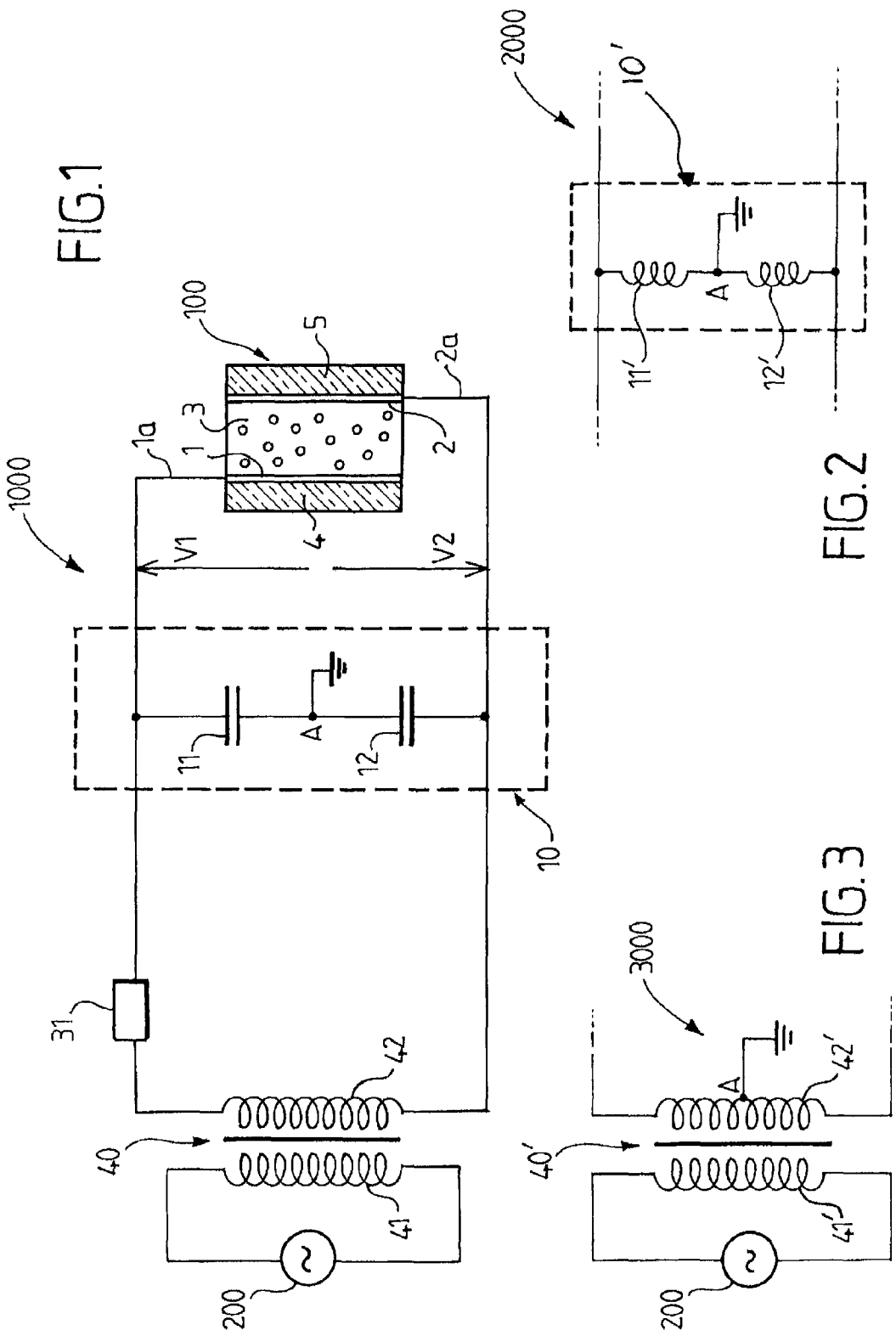

METHOD FOR ELECTRICALLY SECURING AN ELECTRICAL POWER SUPPLY OF A SYSTEM WITH VARIABLE OPTICAL PROPERTIES

CROSS-REFERENCE TO RELATED APPLICATIONS

This application is the U.S. National Stage of PCT/FR2009/051285, filed Jul. 2, 2009, which in turn claims priority to French Application No. 0854586, filed Jul. 4, 2008. The content of both applications are incorporated herein by reference in their entirety.

The subject of the invention is a method of making an electrical power supply of an electrically controllable system for lighting or having variable optical properties electrically safe, and the uses of such an electrically safe system.

Glazing panes having certain characteristics that can be modified through the effect of an appropriate electrical power supply, most especially transmission, absorption and reflection of certain wavelengths of electromagnetic radiation, especially in the visible and/or in the infrared, or else light scattering, are known.

It is especially sought to control the degree of vision through glazing, especially to reduce or completely prevent viewing for a certain time.

One such glazing with variable light scattering properties of known operating principle is liquid-crystal glazing. It is based on the use of a polymer-based film placed between two conductive layers, in which film droplets of liquid crystals are dispersed, especially nematic liquid crystals having a positive dielectric anisotropy. The liquid crystals, when a voltage is applied to the film, align along a preferred axis, thereby allowing vision. Examples of such films are described especially in European patent EP 0 238 164 and the U.S. Pat. No. 4,435,047, U.S. Pat. No. 4,806,922 and U.S. Pat. No. 4,732,456. This type of film, once laminated and incorporated between two glass substrates, is marketed by Saint-Gobain Glass under the trade name Priva-lite.

Such Priva-lite glazing is used as internal partitions between two rooms in a building, or between two compartments in a means of locomotion such as a train or airplane. There are also a number of other applications for this glazing: mention may be made, for example, of vehicle rear-view mirrors that darken when required, thereby preventing the driver from being dazzled. Mention may also be made of transparent glazing that can be in a state which is sufficiently scattering for it to be used as projection screens.

As for the patent application JP 05-256034, this proposes a bathroom window based on liquid-crystal double glazing which, in the opaque state, serves as a projection screen.

However, the Applicant has discovered that this type of liquid-crystal glazing, conventionally supplied with an AC voltage at a frequency of 50 Hz and with maximum voltage of about 100 V approximately, is not sufficiently safe to be used in this potentially dangerous environment, namely a bathroom. The object of the invention is thus to alleviate the risk of electrocution.

The invention will be more particularly described in relation to the electrical power supply of a liquid-crystal system, however it may concern more generally any power supply of an electrically controllable system having the same risk of electrocution.

Thus, the present invention firstly provides a method of making an electrical power supply of an electrically controllable system for lighting or having variable optical properties, when fitted near water, electrically safe, the electrically controllable system comprising a carrier substrate that bears an electroactive element placed between first and second electrodes supplied with a periodic voltage U(t) having a given maximum RMS value $U_0$ at a given low supply frequency, the method comprising limitation of what is called the "touch potential" at the input or output terminal of the electrically controllable system to a maximum value of 50 V or less, the touch potential being defined as the potential experienced by the human body (when earthed) in case of contact with the input or output terminal.

In this way, in the case of a person grounded by water (in a shower, bath, on a boat, in a swimming pool, in a flooded region, etc.) being in contact with the input and/or output terminal, the leakage current is limited and no danger to his health.

The value 50 V corresponds to a value above which electricity becomes dangerous. For an increased safety margin, a maximum value of 40 V may be chosen.

In one embodiment of the invention the RMS voltage $U_0$ is fixed at a value of 80 V or less, and preferably the maximum value of the touch potential is fixed at a value of 40 V or less.

This maximum touch potential may be even lower to meet stringent safety standards (child safety, etc.) and in particularly critical environments, such as swimming pools.

In particular, it is possible to fix the maximum value of the touch potential at 25 V or less, especially for an RMS voltage $U_0$ of 50 V or less.

The minimum voltage that activates a standard liquid-crystal film is about 60 V. It depends on the thickness of the film. Naturally, a very thin film allows the RMS voltage $U_0$ to be lowered, but at the expense of the optical properties (limited opacity).

In the present invention, the expression "low frequency" is understood to mean a frequency between 10 Hz and 400 Hz, especially between 50 Hz and 150 Hz. The mains frequency may be used (50 Hz, 60 Hz, etc.).

The supply voltage U(t) may preferably be sinusoidal.

In a first embodiment of the invention, a capacitive voltage divider is used for the limitation, comprising first and second capacitors, respectively connected to the input terminal and output terminal of the system, and the contact point between the two capacitors is connected to a suitable reference potential $V_{ref}$.

In a second embodiment of the invention, an inductive voltage divider is used for the limitation, comprising first and second coils in series, respectively connected to the input terminal and the output terminal of the system, and the contact point between the two coils is connected to a suitable reference potential $V_{ref}$.

In a third embodiment of the invention, an inductive voltage divider with the secondary winding of a transformer is formed for the limitation, the transformer being connected to the input terminal and the output terminal of the system, and the intermediate output point is connected to a reference potential $V_{ref}$, the primary winding being connected to the mains.

Preferably, the RMS voltage $U_0$ is fixed, via said secondary winding, at a value of 80 V or less.

For the sake of simplicity, the inductances of the first and second coils or the inductance of the secondary winding that forms a voltage divider may be substantially identical.

For the sake of simplicity, the capacitances of the first and second capacitors may be substantially identical.

The voltages across the first and second capacitors or across the inductors may be different, for example 50 V and 30 V, the sum of the voltages being equal to $U_0$.

Advantageously, the reference potential is a ground, preferably earth potential. The input touch potential may be equal to $U_0/2$ just like the output potential (voltage divided by two).

Naturally, additional protection from electrocution may furthermore be provided by:

cutting off the power supply, in case of a short circuit, using a fuse sized so that the increase in the current resulting from a short circuit of one of the input and output terminals triggers this safety mechanism; or cutting off the power supply if the difference between the current at the input and output of the system or if the voltage between the input and the output exceeds a setpoint, the cutting-off for example being achieved using a residual-current circuit breaker associated with the input and output terminals.

Naturally, the invention also relates to the use of the electrically controllable system and its electrical power supply comprising a voltage divider for limitation of the touch potential at the input or output terminal of the system, use:

in a wetroom (in a separate room or in a bedroom or any other room); a Laundromat; a laundry room; in a bathroom; a shower, especially as floor, sidewall, partition or (optionally sliding) door; exterior and interior windows;

in a swimming pool, as a (floor) tile, side (wall), window or changing compartment;

as glass wall panels (shop windows or other windows, especially a first-floor or garden window), especially in regions prone to flooding;

as a substrate for road, municipal, or coastal signs, especially in regions prone to flooding; in a road near (or next to) the sea, a stream, river etc.; and in a boat.

Naturally, the electrically controllable system may form all or part of a partition or other window (transom window, etc.), double glazing, multiple glazing.

With a liquid-crystal active element, the electrically controllable system may naturally (also) serve as a (back)projection screen.

Naturally, the active element may extend substantially over the entire area of the glazing, or over (at least) one restricted region. The active element may be discontinuous, in several pieces (for example pixels).

The active element may be any type comprising one or more layers.

The electrically controllable system may be planar or curved, especially cylindrical, for example a screen for a shower enclosure.

Several types of active elements are possible.

It may be an electrochromic system, therefore having variable light transmission properties, the active element being particles in suspension, known by the abbreviation SPD (suspended particle display).

It may be a lighting system, the active element being an inorganic electroluminescent layer based on a doped phosphor, for example chosen from: ZnS:Cu,Cl; ZnS:Cu,Al; ZnS:Cu,Cl,Mn, or else CaS, SrS. This layer is preferably separated from the electrodes by isolating layers. Examples of such glazing are described in document EP 1 553 153 A (with the materials, for example, in table 6).

It may finally be variable light-scattering glazing, the active element being based on liquid crystals as already mentioned, which generally takes the form of a polymer film, the polymer containing droplets containing liquid crystals. To supply it with electrical power, it is usually placed between two electroconductive layers, especially transparent layers.

Furthermore, the polymer film with its two conductive layers is usually provided on at least one of its sides, and preferably on both of them, with a carrier substrate. The latter is generally transparent. It may be chosen to be rigid or semirigid, for example it may be made of glass or an acrylic polymer, such as polymethyl methacrylate (PMMA), or of polycarbonate (PC). It may also be flexible, especially made of polyethylene terephthalate (PET), or based on certain flexible polycarbonates.

It is thus possible to have a PET/ITO electroconductive layer polymer ITO electroconductive layer/PET structure in the form of an easily handled flexible sheet. This assembly (polymer+electroconductive layers+at least one carrier substrate) may then be laminated to at least one rigid, transparent, glass substrate using at least one organic polymer joining layer made of polyvinylbutyral (PVB), ethylene/vinyl acetate (EVA), or certain polyurethanes (PU).

Thus, the electrically safe, electrically controllable system preferably comprises, even consists of, a laminated glazing comprising;

a first rigid carrier substrate, especially made of glass;

a second substrate, especially a glass counter-substrate, the active element being between two lamination interlayers (organic polymer joining layer made of PVB, EVA or PU).

Any other bonding means may be provided between the two substrates to be joined, especially a pressure-sensitive adhesive of the acrylate derivative type.

Thus, the electrically controllable system is electrically safe enough to consist simply of laminated glazing rather than multiple glazing comprising at least two panes separated by a vacuum cavity or a cavity filled with air or any other gas.

The carrier substrate or substrates are preferably substantially transparent over all or part of their area. They may optionally be tinted. It is possible to provide a peripheral mirror, on the border of the glazing.

It is possible in fact to use all NCAP (nematic curvilinear aligned phase) or PDLC (polymer-dispersed liquid crystal) or CLC (cholesteric liquid crystal) liquid-crystal systems having an operating voltage generally of between 60 V and 100 V.

These liquid-crystal systems may furthermore contain dichroic dyes, especially in solution in the droplets of liquid crystals. It is then possible to modulate both the light scattering and the light absorption of the systems.

It is also possible to use, for example, gels based on cholesteric liquid crystals containing a small amount of crosslinked polymer, such as those described in patent WO 92/19695. More widely, PSCT (polymer-stabilized cholesteric texture) systems may therefore be chosen.

The invention will now be described in greater detail with regard to the appended drawings in which:

FIG. 1 shows a schematic of an electrical power supply for liquid-crystal glazing in a first embodiment of the invention;

FIGS. 2 and 3 show partial schematics of the electrical power supply for liquid-crystal glazing in second and third embodiments of the invention;

AN EXAMPLE OF LIQUID-CRYSTAL GLAZING

Figure 4:
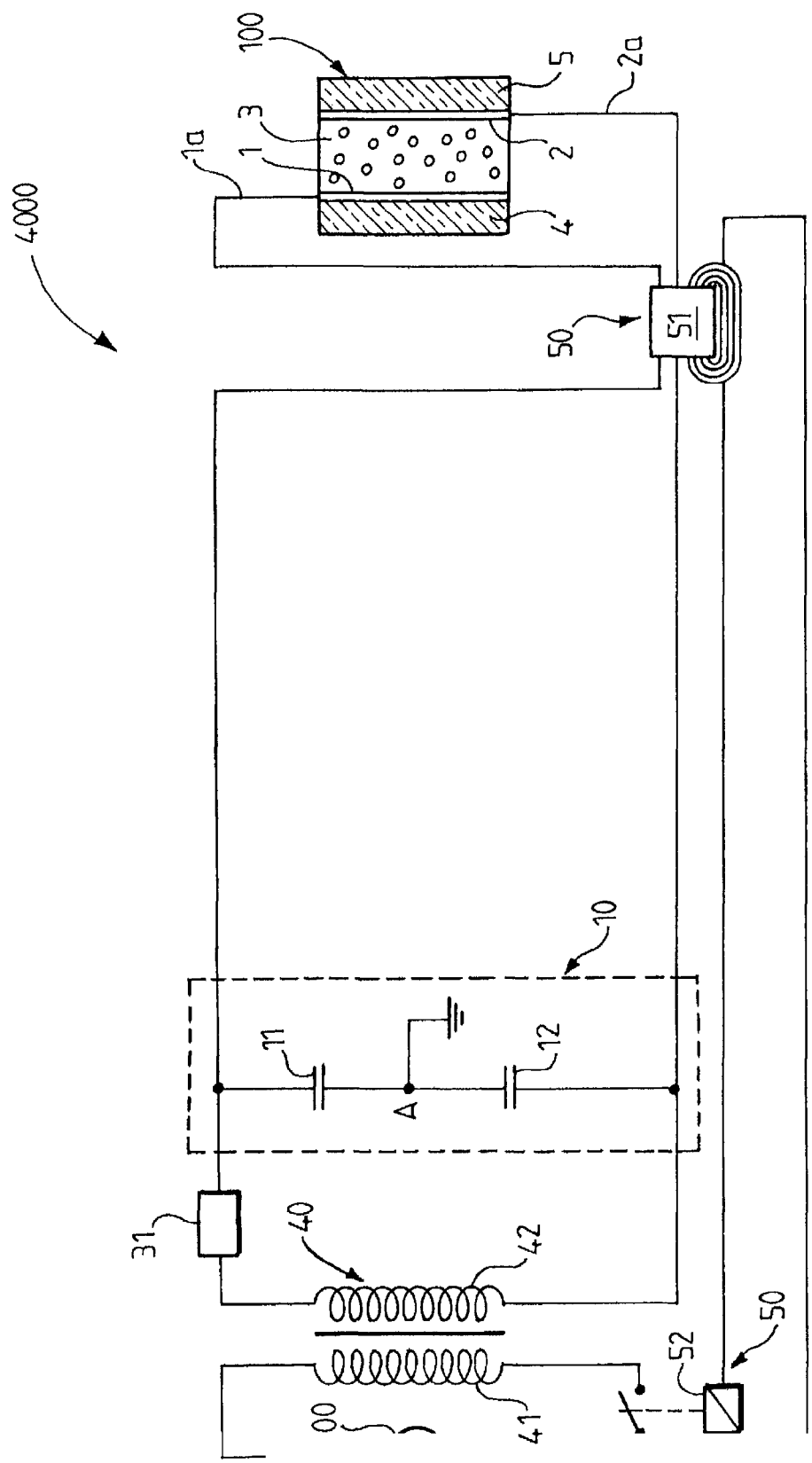
FIG. 4 shows a schematic of the electrical power supply for liquid-crystal glazing in a fourth embodiment of the invention.

Firstly it is recalled that the structure of a Priva-lite system is: Glass/EVA/PET/ITO/liquid-crystal emulsion/ITO/PET/EVA/Glass.

For example, clear, 4 mm thick, soda-lime-silica glass is chosen for the two substrates, this being clear, or even bulk-tinted glass and/or having different thicknesses, for example between 3 and 6 mm.

More precisely, the active system is composed of a transparent polymer film, in which have been previously dispersed microdroplets of a nematic liquid crystal, which forms the liquid-crystal emulsion having a total thickness of 25 μm, and which is sandwiched between the two 175 μm thick PET sheets each coated with a transparent conductive layer made of ITO that has a sheet resistance of 75Ω/□ when 30 nm thick.

The liquid-crystal molecules have more than one refractive index: two equal indexes $n_o$ in the two directions perpendicular to their axis of symmetry and an index $n_e$ in the axis of symmetry. The polymer is chosen so as to have a refractive index very close to the ordinary index $n_o$. In the absence of voltage, the axes of the various droplets are not correlated with one another. The incident light is therefore strongly refracted at each polymer/droplet interface, due to the refractive index difference between the polymer and the randomly oriented droplet. The light is therefore scattered in all directions.

Under a maximum voltage $U_0$, the optical axes of the various droplets align in the direction of the electric field, i.e. perpendicular to the glazing. The incident light, incident essentially normal to the glazing, now sees only a medium of continuous index $n_p$ equal to $n_o$ and is no longer scattered.

Intermediate hazy states are accessible at the desired rate with voltages especially between 0 and $U_0$. For this a dimmer is used.

For example, the first electrode is surmounted by a first busbar, that is a peripheral band along at least one first edge of the glazing. For example, it may be a screen-printed silver enamel track covered with a strip of copper held in place by a conductive adhesive.

The second electrode is surmounted by a second busbar, that is a peripheral band along a second, opposite edge of the glazing, identical to the first busbar.

The Priva-lite active glazing is a real component. Its impedance is defined by a resistance $R_B$ in series with a resistance $R_A$ which is in parallel with a capacitor of capacitance $C_A$.

The various resistances and capacitances depend on the size of the glazing.

$R_B$ is related to the sheet resistance of the electrodes, to the geometry of the glazing and to the position of the connections.

$R_B$ is proportional to the sheet resistance, to the distance D between the two connectors (i.e., in this example, the width of the glazing), and inversely proportional to the height H separating the electrodes, typically a height H of between 50 and 4000 mm.

$R_A$ and $C_A$ depend on the area of the glazing, on the temperature and on the switching state of the glazing.

In the case of the Priva-lite liquid-crystal glazing, typically, at 20° C. and in the off state, $C_A$ is between 2 and 3 μF/m²×A and $R_A$ is between 30 and 80 kΩm²×A, where A is the area of the glazing.

For rectangular Priva-lite glazing measuring 200 cm by 100 cm with the connectors on the long sides (longitudinal edges) at 20° C., $R_B$ is equal to 19Ω, $C_A$ is equal to 6 μF and $R_B$ is equal to 20 kΩ.

Example No. 1 of an Electrical Power Supply

FIG. 1 illustrates an electrical power supply 1000 for making a first embodiment of the invention safe, the power supply delivering electrical energy safely to a Priva-lite, variable light-scattering glazing unit 100 such as described above (liquid-crystal film 3 between two sheets of glass 4, 5 or another of the liquid-crystal technologies already mentioned).

Any of, the other (already mentioned) active glazing, such as phosphor-based glazing for lighting or SPD electrochromic glazing, may also be supplied in the same way.

The electrical power supply 1000 comprises a voltage divider 10 including identical first and second capacitors 11, 12 in series and respectively connected via the input wire 1a and the output wire 2a to the first and second electrodes 1, 2 so as to activate the liquid-crystal film 3. The contact point A between the two capacitors 11, 12 is connected to a reference potential $V_{ref}$, which here is earth potential.

The glazing is supplied with a maximum voltage $U_0$, chosen to be between 60 and 80 V, at a frequency $f_o$ for example equal to 50 Hz.

To do this, the mains 200 delivers a single-phase voltage of 220 V (or respectively 110 V) at a frequency of 50 Hz (or respectively 60 Hz) to the primary winding 41 of a transformer 40, the secondary winding 42 of which is in parallel with the voltage divider and delivers the voltage $U_0$.

For example, ceramic or bipolar electrolytic capacitors are chosen for the capacitors 11, 12.

Conventionally, a switch and a fuse 31 are placed between the input of the active system 100 and the secondary winding 42.

The glazing may be installed:

in a wetroom, for example as a window in a bathroom, as an (especially cylindrical) shower enclosure or as the sidewall of a bath or shower (also optionally forming a partition between the wetroom and another room such as a bedroom), or, in an indoor swimming pool, as a sidewall; or in any other wet or floodable region, especially outside, such as the sidewalls of an outdoor swimming pool, or curtain walling, etc.

If the user is grounded by water (for example in his shower, bath or in a swimming pool, or even in the case of a natural disaster such as a flood, tidal wave, etc.) and inadvertently touches one of the input or output terminals (wires 1a or 2a) when the glazing is live, he experiences only a potential equal to $U_0/2$, i.e. between 30 and 40 V.

Example No. 2 of an Electrical Power Supply

FIG. 2 shows a partial schematic of a second electrical power supply 2000 for the liquid-crystal glazing 100 in a second embodiment of the invention.

This power supply 2000 differs from the first 1000 in that its voltage divider 10' is formed from first and second, preferably identical, coils 11', 12', which thus replace the capacitive voltage divider.

Example No. 3 of an Electrical Power Supply

FIG. 3 shows a partial schematic of a third electrical power supply 3000 for the liquid-crystal glazing 100 in a third embodiment of the invention.

This power supply 3000 differs from the first 1000 in that its voltage divider 40' is formed from the secondary winding 41' of the transformer 40', which winding is connected to the reference potential (here earth) at the intermediate output point A, and which thus replaces the capacitive voltage divider.

If the user inadvertently touches one of the input or output terminals (wire 1a or 2a) when the glazing is live, he experiences only a potential $U_0/2$ of between 30 and 40 V, even if the other terminal (wire 2a or 1a) is inadvertently grounded. The electrical safety is thus increased.

Example No. 4 of an Electrical Power Supply

FIG. 4 shows a schematic of a fourth electrical power supply 4000 for liquid-crystal glazing in a fourth embodiment of the invention.

This power supply 4000 is similar to the first power supply and furthermore comprises a residual-current circuit breaker 50 connected to the input and output terminals of the system 100 and formed from a toroidal system 51 controlling a microrelay 52 for cutting off the current when the input and output currents become substantially different.

Thus, even if one of the input or output terminals is inadvertently grounded the device breaks the circuit, even before the user can receive an electric shock.

Example No. 5 of an Electrical Power Supply

Figure 5:
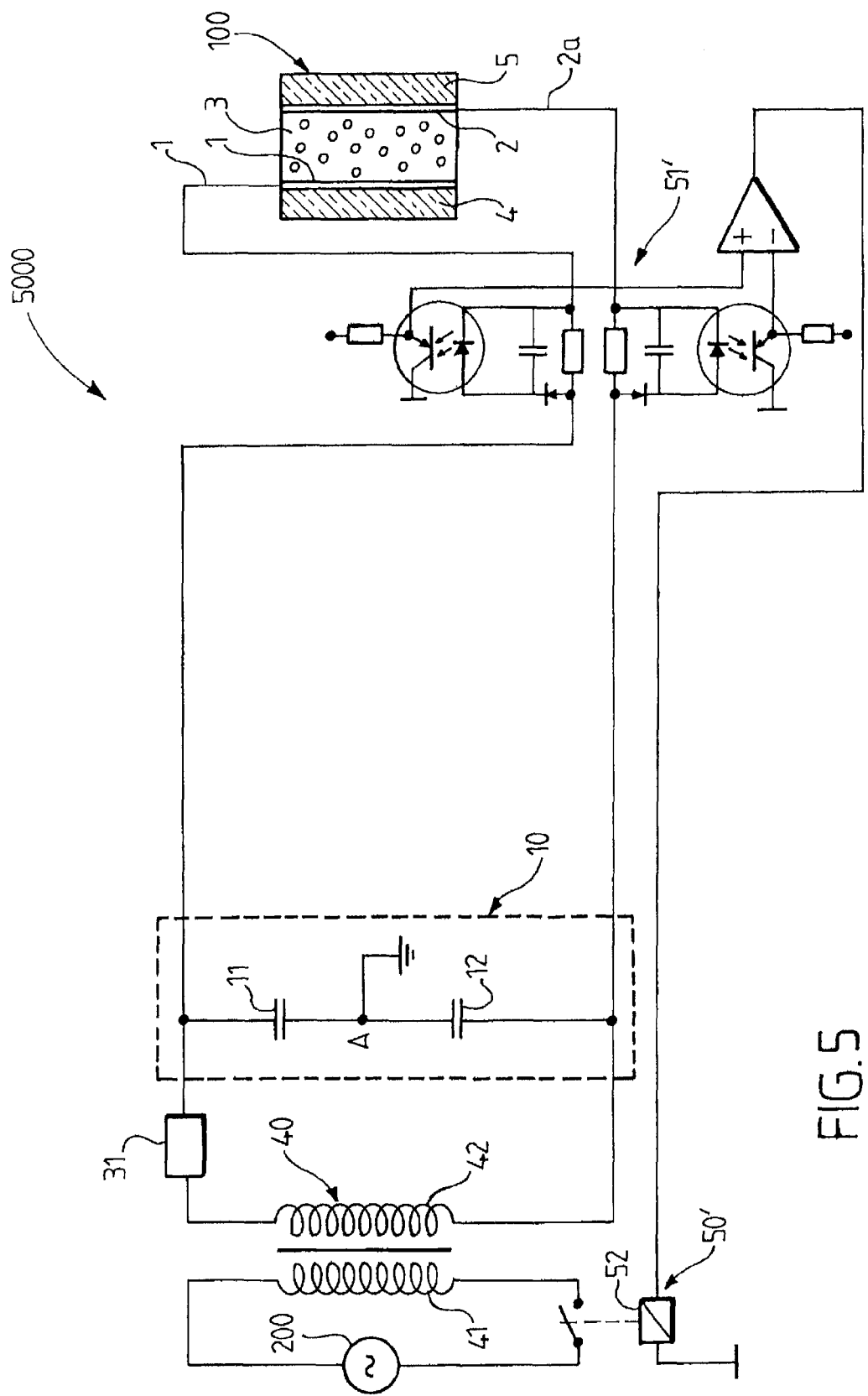
FIG. 5 shows a schematic of the electrical power supply for liquid-crystal glazing in a fifth embodiment of the invention.

FIG. 5 shows a schematic of a fifth electrical power supply 5000 for liquid-crystal glazing in a fifth embodiment of the invention.

This power supply 5000 is a variant of the fourth embodiment 4000 because the residual-current circuit breaker 50' is formed from an electronic unit 51' controlling a microrelay 52' for cutting the current off when the input and output currents become substantially different.

The invention claimed is:
1. A method of making an electrical power supply of an electrically controllable system having variable optical properties, when fitted near water, electrically safe, the electrically controllable system comprising a carrier substrate that bears an electroactive element placed between first and second electrodes supplied with a periodic voltage U(t) having a given maximum RMS value $U_0$ at a given low supply frequency, the method comprising limiting the touch potential at an input or output terminal of the electrically controllable system to a maximum value of 50 V or less, the touch potential being defined as the potential experienced by the human body in case of contact with the input or output terminal.

2. The electrical safety method as claimed in claim 1, wherein the RMS voltage $U_0$ is fixed at a value of 80 V or less.

3. The electrical safety method as claimed in claim 1, wherein the maximum value of the touch potential is fixed at 25 V or less.

4. The electrical safety method as claimed in claim 1, wherein a capacitive voltage divider is used for limiting the touch potential, the capacitive voltage divider comprising first and second capacitors in series, respectively connected to the input terminal and the output terminal of the system, and wherein a contact point between the two capacitors is connected to a reference potential.

5. The electrical safety method as claimed in claim 1, wherein an inductive voltage divider is used for limiting the touch potential, the inductive voltage divider comprising first and second coils of given inductances in series, respectively connected to the input terminal and the output terminal of the system, and wherein a contact point between the two coils is connected to a reference potential.

6. The electrical safety method as claimed in claim 1, wherein a voltage divider with a secondary winding of a transformer is formed for limiting the touch potential, the transformer being connected to the input terminal and the output terminal of the system, and wherein an intermediate output point of the secondary winding is connected to a reference potential, a primary winding of the transformer being connected to the mains, and wherein the RMS voltage $U_0$ is fixed, via said secondary winding, at a value of 80 V or less.

7. The electrical safety method as claimed in claim 1, wherein the power supply is cut off in case of a short circuit or if the difference between the input and output currents or if the voltage between the input and the output exceeds a setpoint C.

8. The electrical safety method as claimed in claim 4, wherein the reference potential is ground.

9. A method comprising providing an electrically controllable system having variable optical properties comprising a carrier substrate that bears an electroactive element placed between first and second electrodes supplied by an electrical power supply comprising a voltage divider for limiting the touch potential at the input terminal or output terminal of the system as claimed in claim 1:
   in a wetroom; a Laundromat; a laundry room; a bathroom;
      in a shower, as a floor, sidewall, partition or door; exterior and interior windows; and/or
   in a swimming pool as a tile, sidewall, window or changing compartment; and/or
   as glass wall panels, as shop windows or other windows; and/or
   in a boat; and/or
   as a substrate for road or municipal signs.

10. The method as claimed in claim 9, wherein the system is in the form of laminated glazing.

11. The method as claimed in claim 9, wherein the system is curved or cylindrical.

12. The method as claimed in claim 9, wherein the electroactive element is based on liquid crystals, or the system is electrochromic and the electroactive element is based on suspended particles.

13. The electrical safety method as claimed in claim 2, wherein the maximum value of the touch potential is fixed at a value of 40 V or less.

14. The method as claimed in claim 10, wherein the laminated glazing is arranged in the following sequence: rigid carrier substrate/lamination interlayer/electroconductive layer/active system layer/electroconductive layer/lamination interlayer/rigid substrate.

15. The method as claimed in claim 10, wherein the system is curved or cylindrical.

16. The electrical safety method as claimed in claim 5, wherein the reference potential is ground.

17. The electrical safety method as claimed in claim 6, wherein the reference potential is ground.

18. The electrical safety method as claimed in claim 7, wherein the reference potential is ground.

* * * * *